(12) United States Patent
Malmquist

(10) Patent No.: US 8,523,425 B2
(45) Date of Patent: Sep. 3, 2013

(54) RESERVOIR TANK WATER MIXING SYSTEM

(76) Inventor: Mark Malmquist, Orcas, WA (US)

( * ) Notice: Subject to any disclaimer, the term of this patent is extended or adjusted under 35 U.S.C. 154(b) by 427 days.

(21) Appl. No.: 12/828,470

(22) Filed: Jul. 1, 2010

(65) Prior Publication Data
US 2012/0000840 A1 Jan. 5, 2012

(51) Int. Cl.
*C02F 1/76* (2006.01)
*B01F 15/00* (2006.01)

(52) U.S. Cl.
USPC .................. 366/165.1; 366/173.1; 366/177.1; 422/224

(58) Field of Classification Search
USPC ................. 210/754, 764, 192, 205, 219, 220; 422/29, 37, 224, 225; 366/165.1, 165.5, 366/167.1, 167.2, 169.2, 173.1, 173.2, 177.1, 366/181.6, 262
See application file for complete search history.

(56) References Cited

U.S. PATENT DOCUMENTS

| | | | |
|---|---|---|---|
| 5,905,038 A | 5/1999 | Parton | |
| 6,129,104 A | 10/2000 | Ellard et al. | |
| 6,477,855 B1 | 11/2002 | Findley et al. | |
| 6,488,402 B1 * | 12/2002 | King et al. | 366/173.2 |
| 6,627,450 B1 | 9/2003 | Taylor et al. | |
| 6,805,787 B2 | 10/2004 | Bess et al. | |
| 6,811,702 B2 | 11/2004 | Verstraete et al. | |
| 6,811,710 B2 | 11/2004 | Simmons | |
| 6,818,124 B1 | 11/2004 | Simmons | |
| 7,153,434 B1 | 12/2006 | Dennis | |
| 7,244,348 B2 | 7/2007 | Fernandez et al. | |
| 7,517,460 B2 | 4/2009 | Tormaschy et al. | |
| 7,615,160 B2 | 11/2009 | Collins et al. | |
| 7,641,792 B2 | 1/2010 | Tormaschy et al. | |
| 7,670,044 B2 | 3/2010 | Tormaschy et al. | |
| 2001/0038572 A1 * | 11/2001 | Dupre | 366/167.2 |
| 2002/0162802 A1 | 11/2002 | Simmons | |
| 2003/0066758 A1 | 4/2003 | Bess et al. | |
| 2004/0219683 A1 | 11/2004 | Taylor et al. | |
| 2005/0084411 A1 | 4/2005 | Childers, II et al. | |
| 2005/0127003 A1 | 6/2005 | Dennis | |
| 2007/0007145 A1 | 1/2007 | Simmons et al. | |
| 2007/0007146 A1 | 1/2007 | Childers, II et al. | |
| 2007/0187336 A1 | 8/2007 | Routh et al. | |
| 2008/0105839 A1 | 5/2008 | Jennings et al. | |
| 2009/0083097 A1 | 3/2009 | Boyd | |
| 2009/0134083 A1 | 5/2009 | Tormaschy et al. | |
| 2009/0139935 A1 | 6/2009 | Matousek et al. | |

FOREIGN PATENT DOCUMENTS
WO 2006001800 A1 1/2006

OTHER PUBLICATIONS

The Tank Shark. Tank Water Quality Management System for Potable and Reclaimed Water. Process Solutions, Inc. 4 pages.
SolarBee. Solar-Powered Reservoir Circulator. Wastewater & Fresh Water Benefits. Copyright 2005 SolarBee Division Pump Systems, Inc. 1 page.

(Continued)

*Primary Examiner* — Lucas Stelling
(74) *Attorney, Agent, or Firm* — Stetina Brunda Garred & Brucker (57) ABSTRACT

A mixing unit may be disposed under water of a circular reservoir tank. The mixing unit squirts out water at an upward, outward and skewed angle so as to facilitate rotation of the water within the tank and vertical mixing of the water so as to destratify the temperature gradients within the water.

8 Claims, 6 Drawing Sheets

(56) References Cited

OTHER PUBLICATIONS

SolarBee. Solar-Powered Reservoir Circulator. Continuous Mixing of Potable & Finished Water Reservoirs. Copyright 2005 SolarBee Division Pump Systems, Inc. 1 page.

SolarBee. Solar-Powered Reservoir Circulator. Fresh Water Benefits. Copyright 2006 SolarBee Division Pump Systems, Inc. 1 page.

SolarBee. Solar-Powered Reservoir Circulator. Eutrophic Lakes & Drinking Water Reservoirs. Copyright 2005 SolarBee Division Pump Systems, Inc. 1 page.

SolarBee. Solar-Powered Reservoir Circulator. Models/Features. Copyright 2008 SolarBee Division Pump Systems, Inc. 2 pages.

SolarBee. Solar-Powered Reservoir Circulator. Potable Water Units for Small to Medium Size (.01-3 MG) Tanks. Copyright 2008 SolarBee Division Pump Systems, Inc. 1 page.

Water and Wastes Digest. Severn Trent Services Awarded U.S. Patent for Large Water Reservoir Management System. Mar. 14, 2005. <http://www.wwdmag.com/Severn-Trent-Services-Awarded-U-S-Patent-for-Large-Water-Reservoir-Management-System/> 3 pages.

PAX Water Technologies Case Study. Copyright 2007 PAX Water Technologies, Inc. Jun. 25, 2007. 3 pages.

PAX Water Technologies Case Study. Copyright 2008 PAX Water Technologies, Inc. Oct. 30, 2008. 3 pages.

Doing More With Less in the Distribution System: A Mandate of Stage 2 Regulations. Water Online the Magazine, Clean Water Edition. <www.wateronline.com> 4 pages.

UK's First Reservoir Management System Marks Two Years of Successful Operation. Copyright 2008 PenWell Corporation. Oct. 10, 2005. 4 pages.

Water Online. ClorTech Reservoir Management Systems (RMS). Copyright 1996-2008 VertMarkets, Inc. 3 pages.

\* cited by examiner

RESERVOIR TANK WATER MIXING SYSTEM

CROSS-REFERENCE TO RELATED APPLICATIONS

Not Applicable

STATEMENT RE

Federally Sponsored Research/Development

Not Applicable

BACKGROUND

The present invention relates to a water mixing system for a reservoir tank.

Potable water or drinking water is distributed to residents of a city by pumping water into a reservoir tank located on a hill. When the resident needs water, the resident opens a water faucet located at the resident's home. The water faucet is connected to the reservoir tank which may be at a higher elevation than the resident. Due to water pressure, the water in the reservoir tank flows to the resident's water faucet, is dispensed and used by the resident.

In order to disinfect the water in the reservoir tank, municipalities typically introduce chlorine and sometimes ammonia into the water. To this end, a sample of the water from the reservoir tank is taken and the amount of chlorine is analyzed to derive the amount of bacteria that remains within the water. The bacteria cancel the chlorine and reduce the amount of chlorine in the water. If no chlorine is detected, then this situation indicates presence of bacteria. If too much chlorine is present in the water, then water may taste horrible and if excessive be toxic. As a result, if too much chlorine is added to the water, then the water is disinfected but tastes horrible and if excessive the water may be toxic. Conversely, if too little chlorine is added to the water, then the water may taste fine but is not disinfected.

One problem of sampling the water in the reservoir tank is the inconsistency or uneven distribution of disinfectants (e.g., chlorine) in the water that might provide a false reading or indication of the amount of disinfectants in the water. For example, the sample may be taken from the reservoir tank. Unfortunately, the amount of disinfectants in the water of the reservoir tank is not even or evenly distributed from top to bottom. The reason for the uneven distribution is that water temperature tends to stratify when in the reservoir tank. Generally, cool water resides at the bottom of the tank and warmer water resides at the top of the tank. More bacteria generally breed at the upper warmer level of the water. As such, a sample reading of the water taken at the top of the reservoir tank may indicate that there is no chlorine in the water. The excess amount of bacteria has cancelled all of the disinfectants at the warmer upper levels. In response, the municipality may insert additional chlorine into the water with the assumption that the detected amount of chlorine in the sampled water (i.e., no chlorine) is representative of the amount of chlorine throughout the reservoir tank. In one scenario, too much chlorine would be added to the water. The water may be disinfected. However, the water may taste awful or be toxic due to the excess chlorine. Please note that the amount of chlorine being measured is in the range of 2½ to 3 parts per million. Conversely, if the water sample is taken from the bottom of the reservoir tank such as through a spigot or other tube flowing or inserted at the lower levels of the water, then the sample of water taken from the cooler lower levels of the reservoir tank may indicate an excess amount of chlorine or no bacteria. The municipality may then add in too little chlorine based on the assumption that the elevated chlorine level at the lower cooler levels is representative of the chlorine level contained throughout the water. In this situation, the water may not taste like chlorine or ammonia. However, the water is not disinfected. The resident may become sick.

Another problem associated with disinfecting water in a reservoir tank is that chlorine and ammonia may mix with the water at different concentrations or efficiencies based on temperature and mixing of the water in the tank. If the water in the tank is poorly mixed, the water in the reservoir tank will have different temperatures based on the elevation and other factors. As a result, the water may be disinfected unevenly.

Yet another problem associated with disinfecting water in a reservoir tank is with the addition of ammonia to the water in the tank. A dangerous chemical reaction may occur if added chemicals are improperly mixed with the water because improper mixing may cause nitrification of the water supply making it unfit for human consumption.

The stratified temperature gradients of the water in the tank may be caused by the temperature difference from the hot sun introducing heat into the metallic reservoir tank and the cold earth or by natural convective evaporation. As such, the upper levels of the water generally are warmer than the lower levels of the water. Additionally, the temperature of the water may be stratified because warm water will tend to rise and cool water will tend to drop.

Prior art systems have been developed to de-stratify the temperature gradients in the water. Unfortunately, these prior art systems have various deficiencies. For example, these prior art systems may rest on the floor of the water tank. Over a period of time, the system vibrates on the floor of the tank and rubs off any coating on the interior side of the tank which would have to be replaced over a period of time. Additionally, these prior art systems may be difficult to install and maintain. In particular, some prior art systems require an underwater diver to dive into the water to set up the mixing unit. Unfortunately, the cost to hire an underwater diver, disinfect the underwater diver and other costs associated with using the underwater diver may be expensive. Another deficiency in the prior art systems is that the speed at which the systems destratify the temperature gradients in the water is slow and not responsive enough. Hence, there is a need in the art for an improved system for mixing water or de-stratifying temperature gradients in water stored within a reservoir tank.

BRIEF SUMMARY

The mixing system disclosed herein addresses the needs discussed above, discussed below and those that are known in the art.

A reservoir tank storing water may include a mixing unit disposed under the water. The mixing unit may be located near a central area of the reservoir tank and have fluid squirting upward, outward and at a skewed angle in order to stir the water within the reservoir tank. The water is stirred about a vertical, central axis of the reservoir tank. Additionally, the water is mixed vertically. The water residing at the upper levels of the reservoir tank is urged downward and the water residing at the lower levels of the reservoir tank is urged upward. The vertical, outward and skewed action of the squirting water out of the mixing unit promotes mixing of the water so that the temperature of the water is more even and a more even distribution of the disinfectants within the water may be achieved. Accordingly, samples taken from the water at the top of the water level may be representative of the disinfectant distribution within the reservoir tank. The amount of chlorine and ammonia to be inserted into the water may be calculated based on this sample reading so that a good balance between disinfection and taste may be achieved.

More particularly, a reservoir system comprising a water tank, drinkable water and a mixing unit is disclosed. The water tank may have a roof and a cylindrical sidewall defining a water tank vertical axis. The water tank may define a central area. The drinkable water may be stored within the water tank and define a water level. The mixing unit may be positioned under the water at the central area of the water tank. The mixing unit may define a mixing unit vertical axis and have two water outlets. Each of the water outlets defining a water nozzle direction for squirting out water in the direction of the water nozzle direction. The water outlets may be positioned symmetrically about the mixing unit vertical axis. The water outlets may be oriented upward, outward and skewed from the mixing unit vertical axis to rotate the water generally about the water tank vertical axis as the water squirts out of the water outlets.

The mixing unit may be hung from the roof of the water tank such as with a rigid tower. The rigid tower may be attached to the roof by way of a hinge for mitigating damage caused by an earthquake. The mixing unit may have three or more water outlets.

The system may further comprise an inlet conduit attached to the mixing unit, a pump attached to the inlet conduit and disposed at the roof of the water tank for pumping water above the water level of the water, and outlet conduits attached to the pump and the water outlets of the mixing unit for flowing the water through the water outlets of the mixing unit and spurting the water through the water outlets in the water nozzle directions.

The system may further comprise a chlorine line in fluid communication with the outlet conduits for chlorinating the water. The system may further comprise an ammonia line having an outlet disposed close to the water outlets for introducing and mixing the ammonia into the path of the water spurting out of the water outlets.

The system may comprise two or more mixing units positioned under the water of the water tank.

In another aspect, a unit for mixing stratified layers of water in a water tank is disclosed. The unit may comprise a body defining a unit vertical axis and having two water outlets. Each of the water outlets may define a water nozzle direction for squirting out water in the direction of the water nozzle direction. The water outlets may be symmetrical about the mixing unit vertical axis. The water outlets may be oriented upward, outward and skewed from the mixing unit vertical axis to rotate the water generally about the water tank vertical axis as the water squirts out of the water outlets.

The unit may have three or more water outlets. The water nozzle direction may be oriented in either a clockwise or counterclockwise about the mixing unit vertical axis. The body may further have a central inlet for pumping water up through the unit.

In another aspect, a method of mixing stratified layers of different temperature water in a round water tank is disclosed. The method may comprise the steps of positioning a mixing unit at a central area of the round water tank; spurting water out of the mixing unit symmetrically about a mixing unit vertical axis wherein the direction of the water spurting out of the mixing unit is upward, outward and skewed from the mixing unit vertical axis to rotate water in the water tank about the central area of the water tank.

The method may further comprise the step of positioning the mixing unit under the water of the water tank. The method may also further comprise the step of providing the mixing unit with the water outlets directed in a counterclockwise direction when the unit is installed in the northern hemisphere or with the water outlets directed in a clockwise direction when the unit is installed in the southern hemisphere.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 7:
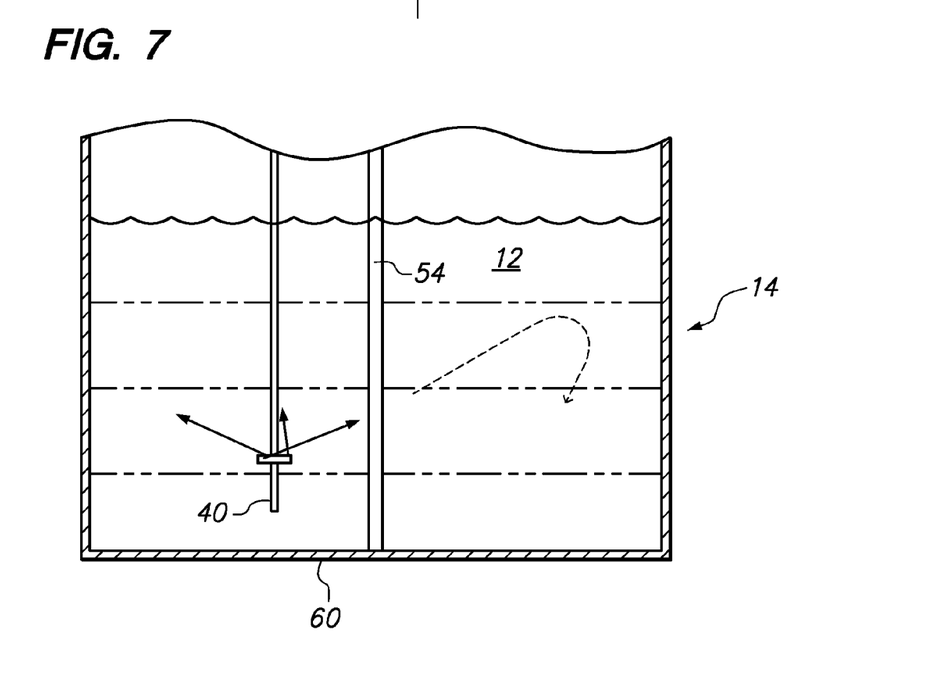
FIG. 7 is a cross sectional view of the reservoir tank shown in FIG. 1 illustrating water being squirted upward to vertically mix the water.

Referring now to the Figures, a mixing system for de-stratifying temperature gradients within water 12 stored within a reservoir tank 14 is disclosed. The mixing system comprises a mixing unit 10 submerged under the water 12 which squirts water to stir the water 12 rotationally (see FIG. 3) about a vertical axis of the reservoir tank 14. The mixing unit 10 also squirts water upward to force the cold water up to mix with the warm water that generally resides at the upper areas of the tank 14 and force the warm water down where the cooler water resides, as shown in FIG. 7. To this end, the water is squirted upward, outward and at an angle from the vertical axis.

Figure 2:
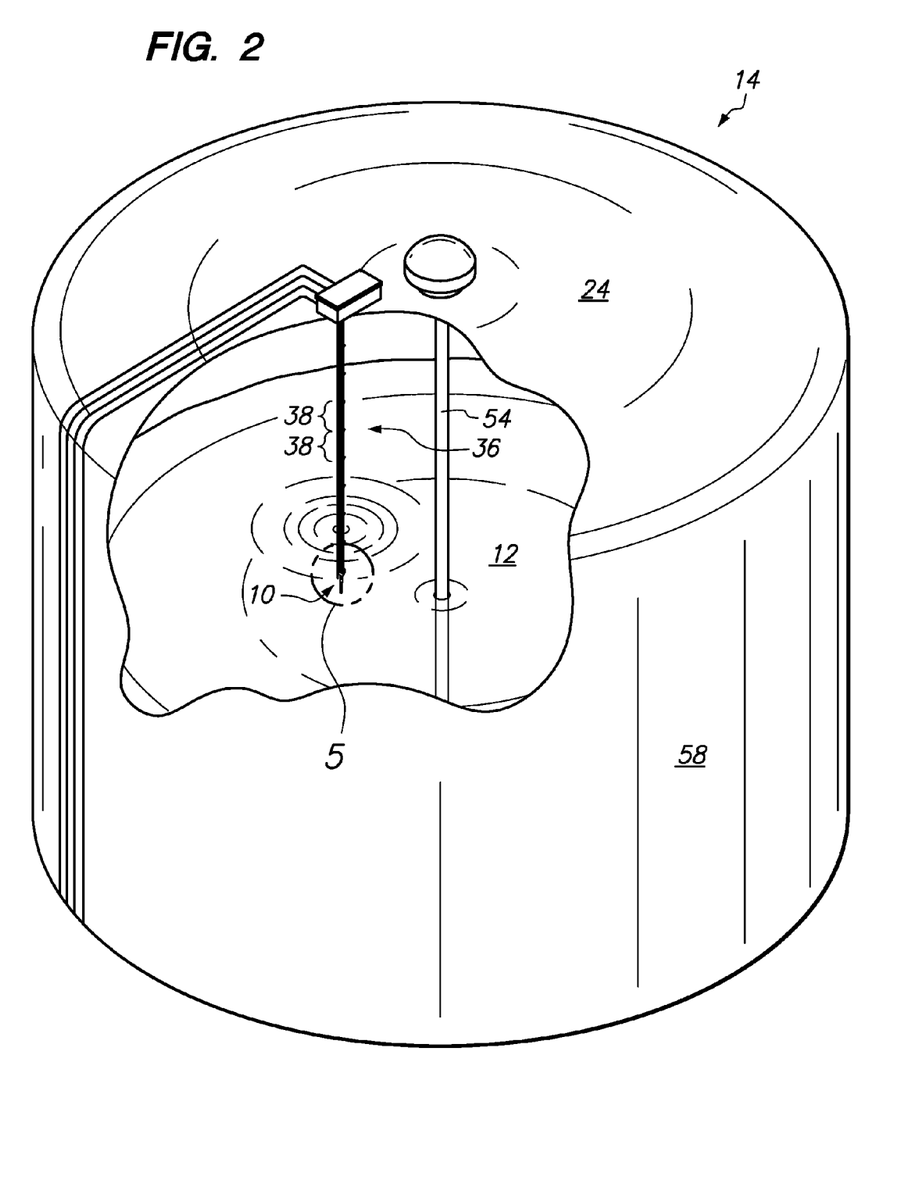
FIG. 2 is a cross sectional view of the reservoir tank shown in FIG. 1 illustrating a mixing unit of the system disposed under water.
Figure 3:
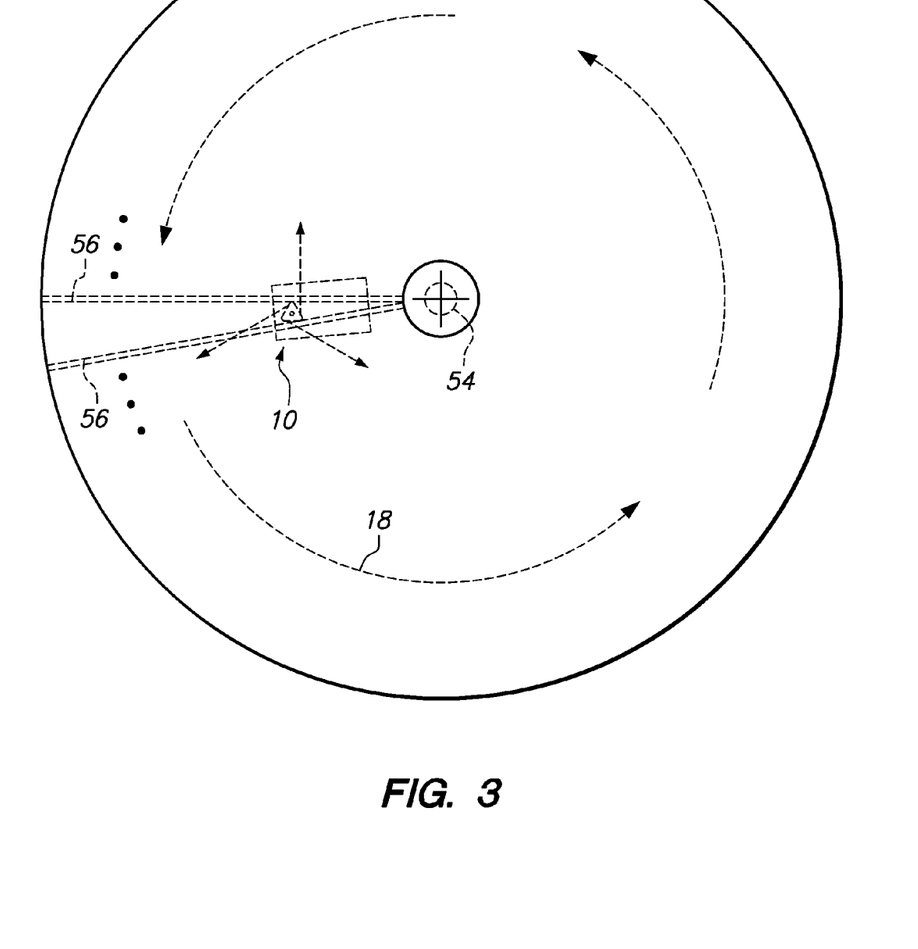
FIG. 3 is a top view of the reservoir tank shown in FIG. 1 illustrating a circular motion of the water caused by the water squirting from a mixing unit of the system.
Figure 6:
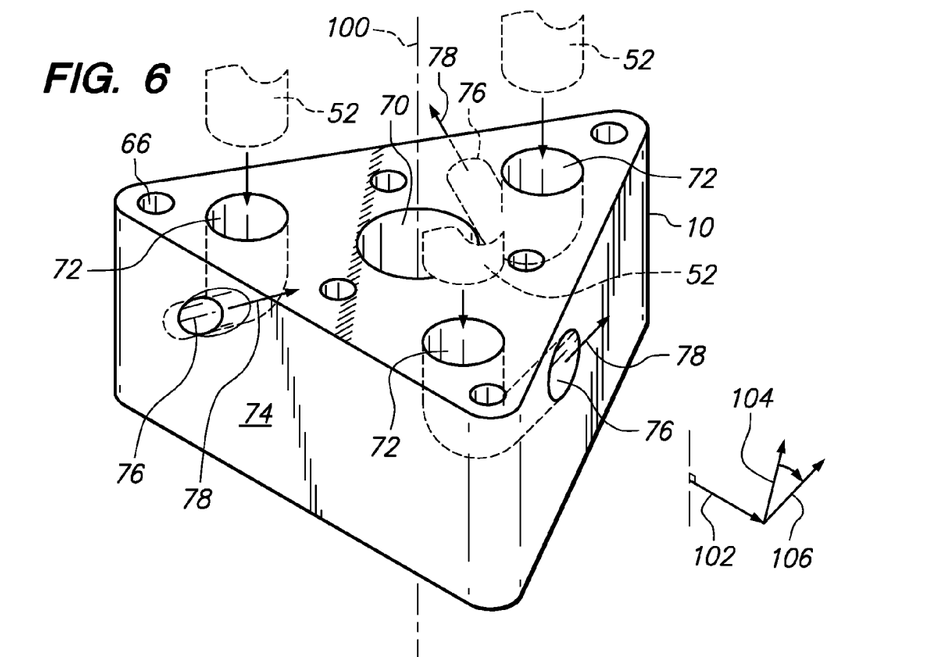
FIG. 6 is a perspective view of the mixing unit.

The mixing unit 10 shown in FIG. 6 may be submerged underwater as shown in FIG. 2. Nozzles or outlet apertures 76 (see FIG. 6) of the mixing unit 10 push water in the upward direction as shown in FIG. 7 and outward as shown in FIG. 3. Also, the water is squirted out at an angle. The upward, outward and angled direction of the water 12 stirs the water to de-stratify temperature gradients within the water 12 of the reservoir tank 14. The outward and angled direction of the water 12 squirting from the mixing unit 10 causes the water 12 to spin in a corresponding direction as shown by arrow 18 in FIG. 3. The water 12 is stirred much like water within a round glass with a stirrer. The upward direction of the water 12 squirting from the mixing unit 10 (see FIG. 7) causes the cooler water to be forced to the upper levels where warm water 12 resides and the warmer water to be forced to the lower levels where cooler water 12 resides. The vertical mixing as well as the rotational mixing mitigate temperature gradients within the water as well as uneven distribution of disinfectants in the water so that sampled water taken from the water in the reservoir tank 14 may be used to calculate the appropriate amount of ammonia and chlorine that should be added into the water to balance taste with disinfection.

Figure 1:
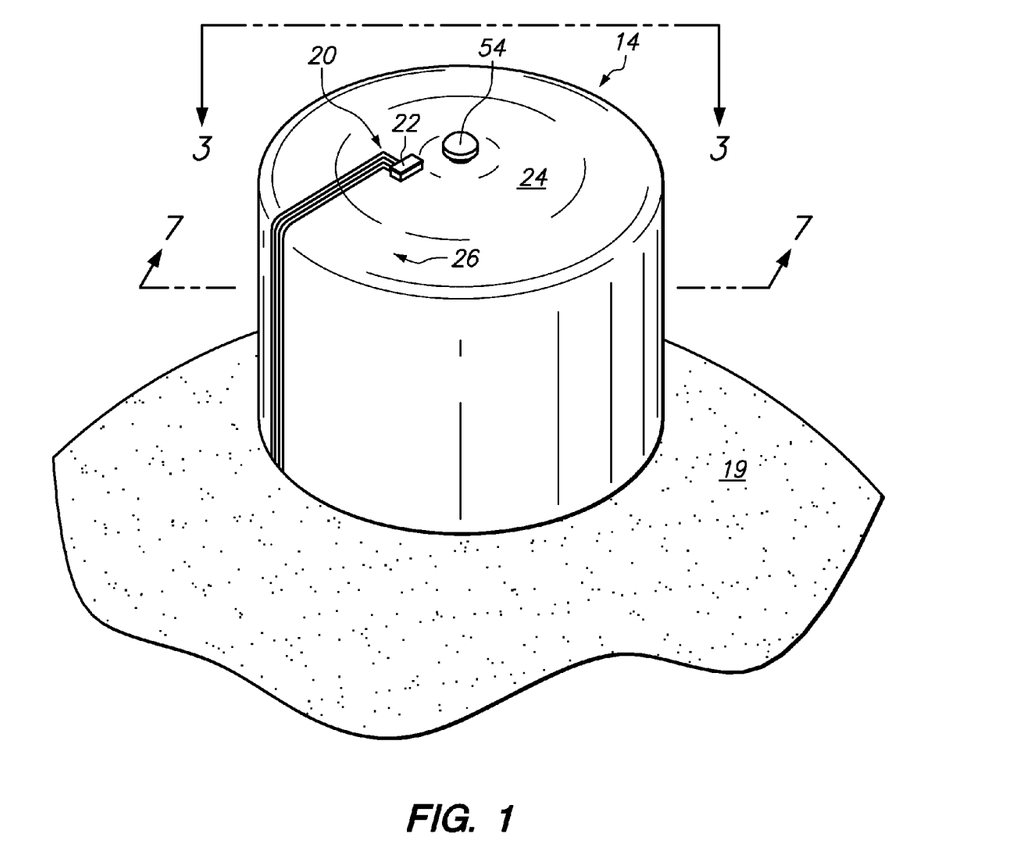
FIG. 1 is a perspective view of a reservoir tank located on a hill with a system for mixing water in the reservoir tank installed thereon.

More particularly, referring now to FIG. 1, the reservoir tank 14 is shown which is typically located on top of a hill 19. When residents and other users of water open a water faucet, water 12 in the reservoir tank 14 is released and flows to the resident or end user due to pressure differential. The reservoir tank 14 is typically round as shown in FIG. 1 since round structures typically hold up to the stress caused by the weight of the water 12 better than other configurations (e.g., square). The reservoir tank 14 additionally may have a roof 24 that covers the water 12 contained therein to prevent contamination of the water. The water 12 contained in the reservoir tank 14 is drinking water or potable water. The roof 24 may be supported by a central support column 54 that extends from the floor 68 to the roof 24 of the tank 14. Additionally, the underside of the roof 24 may have a plurality of I-beams or braces 56 (see FIG. 3) that extend from the sidewall 58 to the central support column 54 of the tanks 14. In FIG. 3, only two braces 56 are shown. However, the braces 56 may span 360 degrees about the column 54.

The mixing system 20 may be mounted to the roof 24 of the reservoir tank 14. In particular, the mixing system 20 may have a weather and tamper resistant box 22 on the roof 24 as shown in FIG. 1. Preferably, the box 22 is located as close to the column 54 to the extent that a tower 36, from which the mixing unit 10 is attached, can fit between the braces 56 and be hung from the roof 24 between the beams 56, as shown in FIG. 3. The purpose of locating the mixing unit 10 as close to the column 54 or central area of the tank 14 is to promote or facilitate a spinning motion to the water as shown in FIG. 3. Chemical lines and electrical lines 26 may be routed to the box 22. The electrical lines 26 and chemical lines 26 may provide electrical power to a pump, etc. located within the box 22 of the mixing system 20. Moreover, the chemical lines 26 may supply ammonia, chlorine, etc. to the mixing system 20 which are mixed into the water 12 to maintain sanitation and disinfection of the water 12 for human drinking use.

Figure 4:
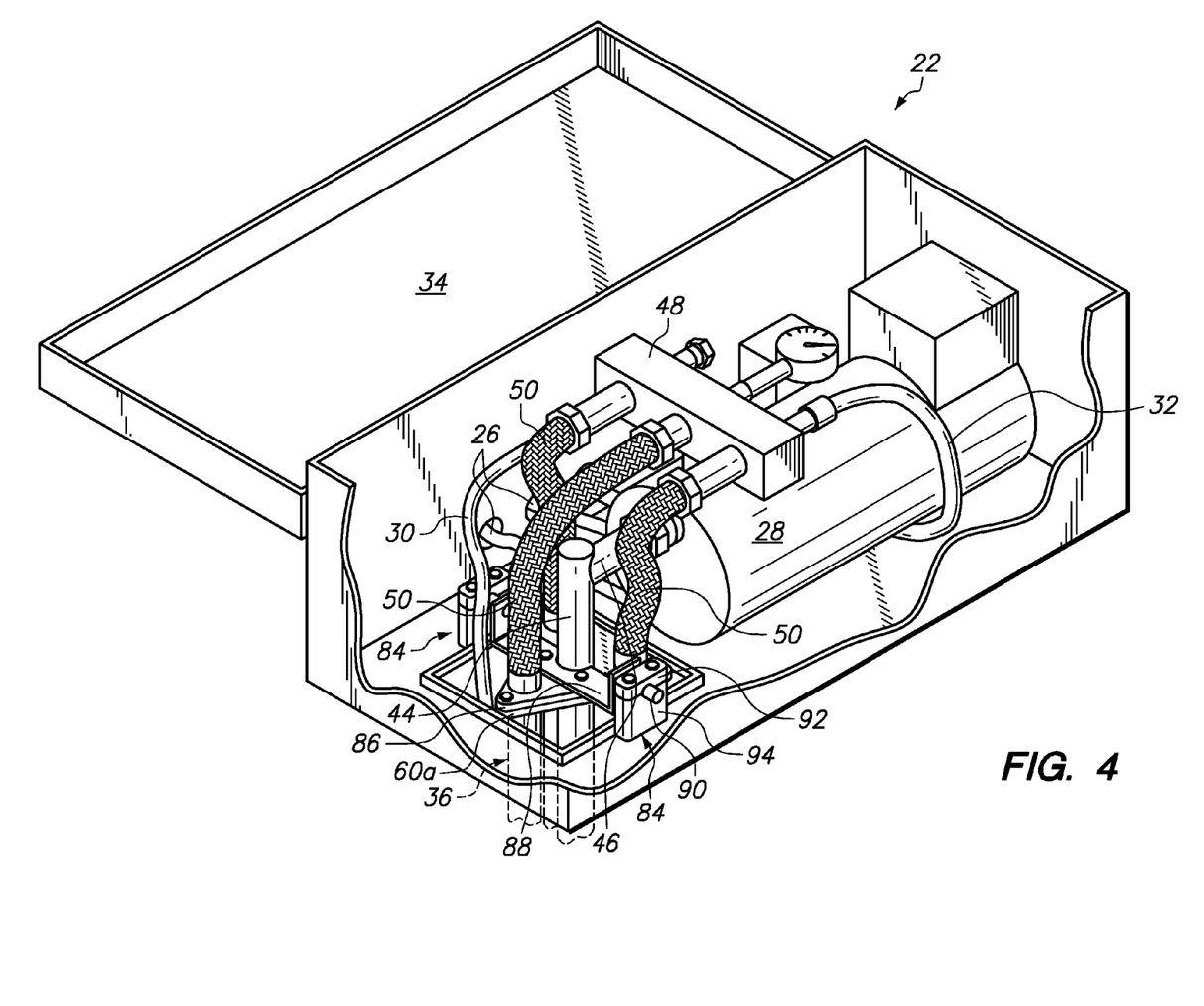
FIG. 4 is a top perspective view of a pump used in the system shown in FIG. 1.

The box 22 may have a lid 34 that can be rotated to the open position shown in FIG. 4 or to the closed position shown in FIG. 1. The box 22 may also have a lock for securing the lid 34 in the closed position. The purpose of the box 22 is to secure the mixing system and the tank 14 from unwanted tampering (e.g., vandalism, terrorism, etc.).

Figure 5:
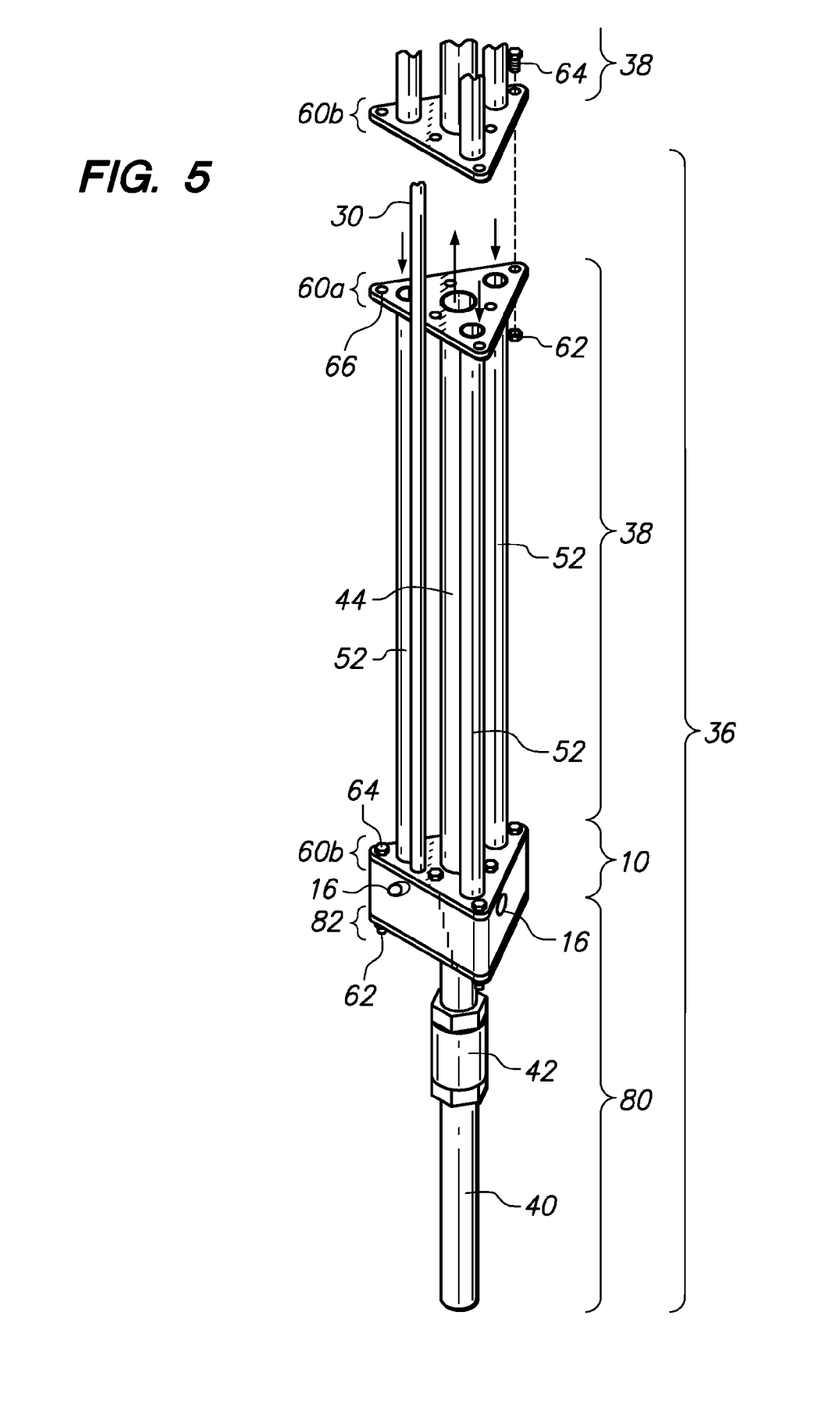
FIG. 5 is a perspective view of a tower incorporating the mixing unit.

The mixing unit 10 may be hung from the roof 24 (see FIG. 2) between the beams 56 (see FIG. 3). More particularly, the mixing unit 10 may be attached to the tower 36. The tower 36 may be fabricated from a plurality of smaller sections 38 and may be attached to each other to adjust the length of the tower 36 so that the mixing unit 10 is located at the lower half of the reservoir tank 14. Referring now to FIG. 5, to attach the sections 38 to each other, the sections 38 of the tower 36 may have end plates 60a, b. The end plates 60a, b may be attached to distal ends of outlet pipes 52 and central pipes 44. The outlet pipes 52 and the central pipes 44 may be welded or attached to the end plates 60a, b so as to form a waterproof seal between the outlet pipes 52 and the central pipes 44 to the end plates 60a, b. Other methods of attaching the end plates 60a, b to the outlet pipes 52 and central pipes 44 are also contemplated such as those that are known in the art or developed in the future. Preferably, the end plates 60a, b are flat and attach to the outlet pipes 52 and the central pipes 44 so that the sections 38 are aligned when attached to each other. In this manner, as the sections 38 of the tower 36 are attached to each other, the tower 36 is generally straight. One or more sections 38 as described above may be stacked upon each other as shown in FIG. 2. The stack of sections 38 of the tower 36 may be attached to each other with a nut 62 and bolt 64 connection, as shown in FIG. 5. To this end, the end plates 60a, b may have matching hole patterns 66. When attaching the different sections 38, a sealant or elastomeric gasket may be disposed between the end plate 60a of one section 38 to the end plate 60b of the adjacent section 38 so that no water seeps into the outlet pipe 52 and the central pipe 44. Multiple sections 38 may be attached to each other until inlet 40 is located at the lower half of the reservoir tank 14. Preferably, the inlet 40 is located close to the floor 68 of the reservoir tank 14. The inlet 40 may be located sufficiently close to but not touching the floor 68 so that water being sucked up the inlet 40 affects sediment residing on the floor 68 of the reservoir tank 14.

The mixing unit 10 may be attached to the end plate 60b of the lower most section 38 of the tower 36. The mixing unit 10 may have an inlet hole 70 centrally located on the mixing unit 10. The inlet hole 70 is aligned with the central pipe 44. The water 12 from the reservoir tank 14 is sucked up or vacuumed up this hole 70 through the central pipe 44 to the pump 28 located on the roof 24 of the reservoir tank 14. The mixing unit 10 may additionally have outlet holes 72 that are aligned to the outlet pipes 52 of the lower most section 38 of the tower 36. After the water 12 is pumped through the pump 28, the water 12 is forced down through the outlet pipes 52 and through the outlet holes 72. The outlet holes 72 may be rerouted out through the sides 74 of the mixing unit 10. The outlet aperture 76 of the outlet holes 72 may define an outlet aperture direction 78. The outlet aperture direction 78 defines the direction in which the water 12 is being squirted out of the mixing unit 10. As discussed above, the water being squirted out of the mixing unit 10 is outward as shown in FIG. 3, upward as shown in FIG. 7 and skewed with respect to a vertical axis of the mixing unit 10. Moreover, the direction of the water being squirted out of the outlet apertures 16 of the outlet holes 72 may be in the same direction to promote the spinning action as shown in FIG. 3.

In relation to the skewed angle of the outlet aperture direction 78, referring to FIGS. 3 and 6, the same 78 is out of plane with respect to a vertical axis such as a vertical axis 100 of the mixing unit 10. The vertical axis 100 may be perpendicular to the ground and parallel to the column 54. The outlet aperture direction 78 is also skewed in the same direction. In FIG. 6, the outlet aperture direction 78 is skewed to the right side. The outlet aperture direction 78 may be skewed to the same side so as to facilitate rotation of the water in the tank 14.

An inlet nozzle 80 may be attached to the bottom side of the mixing unit 10. To this end, the inlet nozzle 80 may have a flat plate 82 which incorporates hole pattern 66 formed in the end plates 60a, b. Likewise, the mixing unit 10 may also incorporate the hole pattern 66 formed in the end plates 60a, b. To attach the mixing unit 10 as well as the inlet nozzle 80 to the underside of the bottom most section 38 of the tower 36, nut 62 and bolt 64 connection may be made so as to attach the end plate 60b of the lower most section 38, the mixing unit 10 and the flat plate 82.

The inlet 40 may be attached to a one way ball valve 42 that is in fluid communication with the inlet hole 70 of the mixing unit 10 and the central pipe 44. The inlet 40 receives the water 12 from the reservoir tank 14. The water 12 passes through the one way ball valve 42 and up to the pump 28. In the event that the pump 28 fails or is turned off, the water 12 residing within the central pipe 44 does not flow backward into the reservoir tank 14.

Referring now to FIG. 4, the box 22 mounted to the roof 24 of the reservoir tank 14 may have a mounting bracket 84 for the tower 36. To mount the tower 36 to the bracket 84, the end plate 60a of the upper most section 38 of the tower 36 may be secured to flat plate 86. The flat plate 86 may have a similar hole pattern 66 as that formed in the end plate 60a. Nuts and bolts 62, 64 may be used to attach the end plate 60a to the flat plate 86. Flex hoses 50 may be attached to the flat plate 86 and be in fluid communication with the outlet pipes 52 of the sections 38 of the tower 36. After water 12 is pumped through the pump 28, the pump 28 forces water 12 through the flex hoses 50 and down the outlet pipes 52. A U-joint 88 may be attached to the flat plate 86 with a nut and bolt 62, 64 connection. Distal end portions of U-joint 88 may have studs 90 that extend laterally outward and into the brackets 84. The brackets 84 may have upper and lower sections 92, 94 that form a round aperture for receiving the studs 90. The tower 36 may pivot about the studs 90 within the brackets 84 in the event of an earthquake or other seismic activity. The mounting attachment of the tower 36 to the roof 24 of the reservoir tank 14 pivots about a single axis. However, it is also contemplated that the tower 36 may be mounted to the roof 24 of the reservoir tank 14 so as to move about multiple axes such as by mounting the tower 36 to a gimbal.

To complete the flow of water 12 through the system 20, the water 12 flows up through the central pipe 44 into inlet 46 of the pump 28. The pump 28 forces water 12 into the manifold 48 that splits up the water 12 into the hoses 50.

As a summary, the pump 28 vacuums water from the lower half of the tank 14 or regions close to the floor 68 of the reservoir tank 14, up through the inlet 40 to the roof 24 of the reservoir tank 14. The pump 28 forces water 12 through the manifold 48 and through the hoses 50. The water 12 proceeds through the outlet pipes 52 and is squirted out of the mixing unit 10 in the direction of outlet aperture direction 78. The water 12 is squirted out of the mixing unit 10 in an outward, upward and skewed direction as shown in FIGS. 3 and 7.

The chlorine line 32 is in fluid communication with the manifold 48. The chlorine line 32 adds chlorine to the water 12 being pumped back into the reservoir tank 14. The chlorine line 32 provides the right amount of chlorine 32 to kill harmful bacteria, etc. in the water 12 to maintain drinkability of the water yet reduce or minimize chlorine taste in the water. Chlorine is inserted at the manifold 48 to disinfect the water 12. The amount of chlorine inserted may be based on a sample of the water taken manually or through machine automation.

In addition to chlorine 32, ammonia 30 may be added to the water 12 in the reservoir tank 14. To this end, an ammonia line 30 may be routed adjacent the tower 36. The outlet 98 of the ammonia line 30 may be secured adjacent the outlet aperture 76 of the mixing unit 10. The ammonia line 30 drips or inserts or flows ammonia 30 squirting out of the outlet aperture 76. The ammonia 30 is caught within the squirting water 12 so as to effectively mix the ammonia 30 into the water 12 residing in the tank 14. Eventually, all of the water 12 within the tank 14 is pumped up through inlet 40, chlorinated and mixed with ammonia 30 so as to chloraminate the water 12.

The installation of the mixing unit 10 in the reservoir tank 14 is simple and cost effective. In particular, the mixing unit 10 is set up on the roof 24 of the reservoir tank 14. The sections 38 of the tower 36 are assembled. The inlet 40, one way ball valve 42 and mixing unit 10 are attached to the bottom side of the tower 36. Once assembled, the tower 36 with the mixing unit 10 is lowered from the roof 24 into the water 12 of the reservoir tank 14. The tower 36 is attached to the bracket 84. Accordingly, no divers or special equipment is needed to install the mixing unit 10. Similarly, during maintenance, no underwater divers are necessary to maintain the mixing unit 10. Rather, the tower 36 can be disassembled from the mounting bracket 84 and pulled up to access the sections 38 of the tower 36, the mixing unit 10, the inlet 40 and the one way ball valve 42 in the event of a malfunction or any necessary maintenance on the components. Accordingly, the system described herein provides a means for de-stratifying temperature gradients in the water of the reservoir tank and also for enabling easy assembly without an underwater diver to install and/or maintain the system.

In an aspect of the system, no part of the system contacts the floor of the reservoir tank 14. Beneficially, any coating that may be applied on the interior surface of the reservoir tank 14 is not degraded over time due to vibration caused by water flow through the mixing unit 10.

Referring back to FIG. 6, the outlet aperture direction 78 may have three different components, namely, outward, upward and skewed. The outward direction is shown as arrow 102. The outward direction 102 is generally perpendicular to the vertical axis 100. The upward direction is shown as arrow 104. The upward direction 104 is still within the plane of the vertical axis 100 and is skewed with respect to the outward direction 102. The upward angle may be between about 1 degree to about 89 degrees but is preferably about 45 degrees. The skewed direction is shown as arrow 106 and represents arrow 104 rotated about an axis defined by arrow 102. The skewed direction 106 may be rotated in the clockwise direction as shown in FIG. 6, or in the counter clockwise direction. The skew angle may be between about 1 degree to about 89 degrees but is preferably about 45 degrees.

The mixing unit 10 is shown as having three outlets outlet apertures 76 which are symmetrically disposed about the vertical axis 100. It is contemplated that the mixing unit 10 may have any number of outlet apertures 76. For example, the mixing outlet may have two or more outlet apertures 76 and corresponding number of outlet pipes 52. Preferably, the outlet apertures are formed symmetrically about the vertical axis so that forces applied to the tower 36 by the water squirting out of the outlet apertures 76 are in the same direction and forces are evenly applied to the tower 36. Nonetheless, it is further contemplated that the mixing unit 10 may only have one outlet aperture 76 which may not permit even application of force to the tower 36. Nonetheless, the tower 36 and corresponding connecting means may be strengthened to accommodate the uneven forces.

The reservoir tank 14 shown and described herein was in relation to a round reservoir tank. However, it is also contemplated that the various teachings herein are also contemplated to other configurations of reservoir tanks 14 such as square, etc.

The above description is given by way of example, and not limitation. Given the above disclosure, one skilled in the art could devise variations that are within the scope and spirit of the invention disclosed herein, including various ways of regulating chlorine and ammonia. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A reservoir system comprising:
   a water tank having a roof and a cylindrical sidewall defining a water tank vertical axis, the water tank defining a central area;
   drinkable water stored within the water tank and defining a water level;
   a mixing unit positioned under the water at the central area of the water tank, the mixing unit defining a mixing unit vertical axis and having at least two water outlets, each of the water outlets defining a water nozzle direction for squirting out water in the direction of the water nozzle direction, the water outlets being symmetrical about the mixing unit vertical axis, the water outlets being oriented upward, outward and skewed from the mixing unit vertical axis to rotate the water generally about the water tank vertical axis as the water squirts out of the water outlets;

an inlet conduit attached to the mixing unit;

a pump attached to the inlet conduit and disposed at the roof of the water tank for pumping water above the water level of the water; and outlet conduits attached to the pump and the water outlets of the mixing unit for flowing the water through the water outlets of the mixing unit and squirting the water through the water outlets in the water nozzle directions.

2. The system of claim 1 wherein the mixing unit is hung from the roof of the water tank.

3. The system of claim 2 wherein the mixing unit is hung from the roof of the water tank with a rigid tower.

4. The system of claim 3 wherein the rigid tower is attached to the roof by way of a hinge for mitigating damage caused by an earthquake.

5. The system of claim 1 wherein the mixing unit has three or more water outlets.

6. The system of claim 1 further comprising a chlorine line in fluid communication with the outlet conduits for chlorinating the water.

7. The system of claim 6 further comprising an ammonia line having an outlet disposed close to the water outlets for introducing and mixing the ammonia into the path of the water squirting out of the water outlets.

8. The system of claim 1 comprising two or more mixing units positioned under the water of the water tank.

* * * * *